United States Patent
Schrans et al.

(10) Patent No.: US 12,248,189 B2
(45) Date of Patent: Mar. 11, 2025

(54) DEMULTIPLEXER

(71) Applicant: ROCKLEY PHOTONICS LIMITED, Altrincham (GB)

(72) Inventors: Thomas Pierre Schrans, Temple City, CA (US); Andrea Trita, Pasadena, CA (US); Adam Scofield, Los Angeles, CA (US)

(73) Assignee: Rockley Photonics Limited, Altrincham (GB)

( * ) Notice: Subject to any disclaimer, the term of this patent is extended or adjusted under 35 U.S.C. 154(b) by 202 days.

(21) Appl. No.: 17/793,914

(22) PCT Filed: Jan. 22, 2021

(86) PCT No.: PCT/EP2021/051505
§ 371 (c)(1),
(2) Date: Jul. 19, 2022

(87) PCT Pub. No.: WO2021/148637
PCT Pub. Date: Jul. 29, 2021

(65) Prior Publication Data
US 2023/0058741 A1 Feb. 23, 2023

Related U.S. Application Data

(60) Provisional application No. 62/964,557, filed on Jan. 22, 2020.

(51) Int. Cl.
*G02B 6/42* (2006.01)
*G02B 6/12* (2006.01)
(Continued)

(52) U.S. Cl.
CPC ....... *G02B 6/4215* (2013.01); *G02B 6/12019* (2013.01); *G02B 6/29344* (2013.01);
(Continued)

(58) Field of Classification Search
CPC .................................................. G02B 6/12019
See application file for complete search history.

(56) References Cited

U.S. PATENT DOCUMENTS 6,289,147 B1 * 9/2001 Bulthuis ............ G02B 6/12019
385/24
9,584,246 B2 2/2017 Jeong
(Continued)

FOREIGN PATENT DOCUMENTS

CN 104918145 B 10/2018
EP 1 266 471 A1 12/2002
(Continued)

OTHER PUBLICATIONS

Abe, M. et al., "Mach-Zehnder interferometer and arrayed waveguide-grating integrated multi/demultiplexer with photosensitive wavelength tuning", OSA/IPR, 2000, 3 pages.
(Continued)

*Primary Examiner* — Eric Wong
(74) *Attorney, Agent, or Firm* — Womble Bond Dickinson (US) LLP

(57) ABSTRACT

A demultiplexer for use in a wavelength division multiplexed system. The demultiplexer comprises: an input waveguide, configured to receive a wavelength division multiplexed signal; a demultiplexing element, configured to demultiplex the multiplexed signal received from the input waveguide into a plurality of multi-mode demultiplexed signal components; a multi-mode output waveguide, the multi-mode output waveguide being coupled to the demultiplexing element and configured to receive one of the multi-mode demultiplexed signal components; and a splitter, coupled to the multi-mode output waveguide, and configured to split the received multi-mode demultiplexed signal component into two single-mode outputs.

11 Claims, 10 Drawing Sheets

(51) Int. Cl.
  *G02B 6/293* (2006.01)
  *H04B 10/2581* (2013.01)
(52) U.S. Cl.
  CPC ....... *G02B 6/29352* (2013.01); *G02B 6/2938* (2013.01); *H04B 10/2581* (2013.01)

(56) References Cited

U.S. PATENT DOCUMENTS

| | | | |
|---|---|---|---|
| 2016/0234018 A1* | 8/2016 | Frohlich | H04B 10/70 |
| 2017/0038531 A1 | 2/2017 | Kato et al. | |
| 2017/0048016 A1* | 2/2017 | Li | H04J 14/0305 |
| 2019/0391242 A1* | 12/2019 | Asghari | G01S 17/89 |
| 2020/0099463 A1* | 3/2020 | Dharanipathy | H04J 14/06 |
| 2022/0221313 A1* | 7/2022 | Labeye | G02B 6/12016 |

FOREIGN PATENT DOCUMENTS

| | | |
|---|---|---|
| EP | 1 091 220 B1 | 12/2008 |
| JP | 6302375 B2 | 3/2018 |

OTHER PUBLICATIONS

Cincotti, G. et al., "Design and Performances of Logarithmic Wavelength Demultiplexers", IEEE Photonics Technology Letters, May 2004, pp. 1325-1327, vol. 16, No. 5, IEEE.

Doi, Y. et al., "Compact ROSA for 100-GB/s (4 x 25 GB/s) Ethernet with a PLC-based AWG demultiplexer", Optical Fiber Communication Conference and Exposition and the National Fiber Optic Engineers Conference (OFC/NFOEC) Technical Digest, 2013, 3 pages, OSA.

Hsu, S-H. et al., "A S-bend Multimode Interference with Optical Delay and Power Divider for Broadband WDM Filtering", 2017, pp. 153-154, IEEE.

International Search Report and Written Opinion of the International Searching Authority, mailed Apr. 1, 2021, corresponding to PCT/EP2021/051505, 12 pages.

Khatun, R. et al., "Implementation of a 1x16 Router Using 2x2 Mach-Zehnder Interferometer Electro-Optic Switch", 2015, Proceedings of International Conference on Electrical Information and Communication Technology, pp. 288-293, IEEE.

Khatun, R. et al., "Implementation of a 1x16 Router Using 2x2 Mach-Zehnder Interferometer Electro-Optic Switch", 2015 International Conference on Electrical Information and Communication Technology (EICT), 2015, pp. 295-300, IEEE.

Kumar, S. et al., "1 x 8 signal Router using cascading the Mach-Zehnder Interferometers", 2013 $6^{th}$ IEEE/International Conference on Advanced Infocomm Technology (ICAIT), Jul. 6, 2013, pp. 161-162, IEEE.

Melati, D. et al., "Athermal echelle grating filter in silicon-on-insulator using a temperature-synchronized input", Optics Express, Oct. 19, 2018, pp. 28651-28660, vol. 26, No. 22, Optical Society of America.

U.K. Intellectual Property Office Examination Report, dated Apr. 27, 2022, for Patent Application No. GB2100862.8, 7 pages.

U.K. Intellectual Property Office Search and Examination Report, dated Oct. 25, 2021, for Patent Application No. GB2100862.8, 12 pages.

* cited by examiner

DEMULTIPLEXER

CROSS-REFERENCE TO RELATED APPLICATION(S)

This application is a U.S. national stage entry, under 35 U.S.C. § 371, of International Application Number PCT/EP2021/051505, filed on Jan. 22, 2021, which claims priority to and the benefit of U.S. Provisional Application No. 62/964,557, filed Jan. 22, 2020. The entire contents of all of the applications identified in this paragraph are incorporated herein by reference.

FIELD OF THE INVENTION

The present invention relates to a demultiplexer.

BACKGROUND

Optical demultiplexers and multiplexers, like those based on arrayed waveguide gratings or Echelle gratings, are temperature dependent due to the refractive index of the material forming them depending on temperature. In examples formed from silicon, the centre wavelength of a given channel might change at a rate of 0.075 nm° $C.^{-1}$.

Typical demultiplexers have a Gaussian-like channel shape, which can increase the difficulty of controlling insertion loss, optical bandwidth, and crosstalk to adjacent channels independently.

In applications such as 4-channel course-wavelength-division-multiplexing (CWDM4) the optical interconnects need to work in environments which are not tightly temperature controlled, and at the same time have wide optical passbands and stringent adjacent channel crosstalk whilst maintaining low insertion losses. These devices typical rely on using a single mode silicon photonic waveguide, which results in the Gaussian-like channel.

In order to break this dependency between bandwidth and crosstalk, the output waveguides can be designed to be (horizontally) multimode, MM, such that the channel response (measured as the total power guided by the MM waveguide as a function of frequency) has a larger bandwidth than for a single mode waveguide. However here the channel roll-off will still be similar to single mode waveguides and hence the adjacent channel crosstalk will be similar to single mode waveguide based devices.

This type of demultiplexer, with MM output waveguides, works well when the detectors (e.g. photodiodes) following the demultiplexer can handle the multi-modal nature of the light. For example, surface illuminated photodiodes. However, when the receiver bit rate goes up, detectors like surface illuminated photodiodes either fail to meet the speed requirements or become so small that the spot size created by the multimode output waveguide is larger than the detector active aperture and therefore the detector cannot convert all of the light into an electrical signal. One solution to this problem would be to use waveguide based photodiodes, or waveguide based avalanche photodiodes.

Waveguide based photodiodes are typically based on single mode waveguides, as the waveguide includes a p-i-n semiconductor junction which must be narrow enough to meet the speed requirements of the system. A typical waveguide photodiode is implemented in silicon with a horizontal p-i-n junction, and therefore the width of the photodiode is limited by the required p-i-n junction length which typically results in a single mode waveguide. If the incoming waveguide connection to the single mode waveguide is multi-modal, then there will be inherent coupling losses between the input waveguide and the photodiode waveguide as only one of the modes in the multi-mode waveguide can efficiently couple to the single one mode of the photodiode. Typically the combination of a demultiplexer with multi-mode output waveguides and a single mode photodiode cancels, in that the channel broadening accomplished with the multi-mode output waveguides in the demultiplexer is undone.

A solution to this would be to create waveguide photodiodes where the waveguide is multi-modal. However in practice this does not work well for horizontal p-i-n junctions, as the horizontal edges of the waveguides are lossier due to the presence of the p and n dopants. As a result, the responsivity of the photodiode in the system will show wavelength dependence because the superposition of the multiple modes results in a net optical intensity distribution which moves around with wavelength. So while at a particular wavelength in the channel passband in the intensity distribution in the waveguide photodiode may be centred, and there is very little net absorption in the doped regions of the waveguide, at another wavelength in the channel passband the intensity distribution in the photodiode waveguide may not be centred anymore and may overlap with the doped regions, leading to a reduced responsivity.

The invention has been devised in light of the above considerations.

SUMMARY

Accordingly, in a first aspect, embodiments of the invention provide a demultiplexer for use in a wavelength division multiplexed system, the demultiplexer comprising:
  an input waveguide, configured to receive a wavelength division multiplexed signal;
  a demultiplexing element, configured to demultiplex the multiplexed signal received from the input waveguide into a plurality of multi-mode demultiplexed signal components;
  a multi-mode output waveguide, the multi-mode output waveguide being coupled to the demultiplexing element and configured to receive one of the multi-mode demultiplexed signal components; and
  a splitter, coupled to the multi-mode output waveguide, and configured to split the received multi-mode demultiplexed signal component into two single-mode outputs.

Such a demultiplexer demonstrates improved behaviour, e.g. a flatter pass-band and/or a thermal response, than the prior art.

The demultiplexer may have any one or, to the extent that they are compatible, any combination of the following optional features.

The splitter may be configured to split the received multi-mode demultiplexed signal asymmetrically.

The splitter may be configured to split the received multi-mode demultiplexed signal symmetrically.

The splitter may be configured to provide each single-mode output to a respective transfer waveguide. The demultiplexer may be a receiver and may include a waveguide photodiode, connected at a first end to one of the transfer waveguides and connected at a second end to the other of the transfer waveguides. The waveguide photodiode may be configured to absorb at least 90% of the signal received from either end within a half of a length of the waveguide photodiode.

The demultiplexer may include a plurality of multi-mode output waveguides, each being coupled to the demultiplexing element and configured to receive a respective one of the multi-mode demultiplexed signal components. The demultiplexer may include a plurality of splitters, each coupled to a respective multi-mode output waveguide, and configured to split the received multi-mode demultiplexed signal component into two single-mode outputs.

The demultiplexer may include an output Mach-Zehnder interferometer, connected to each of the respective transfer waveguides or to the output waveguide(s) and operable as a wavelength filter. The demultiplexer may include a plurality of output Mach-Zehnder interferometers, each connected to a respective pair of transfer waveguides or to a respective output waveguide and being operable as a wavelength filter.

The demultiplexer may include an input Mach-Zehnder interferometer, connected between the input waveguide and the demultiplexing element, the input Mach-Zehnder interferometer being operable as a wavelength filter.

The transfer waveguides may have a similar, substantially identical, or identical optical path length.

The demultiplexing element may be an arrayed waveguide grating, or an echelle grating.

The multi-mode output waveguide may comprise a pair of waveguide ridges projecting from a shared waveguide slab. Each waveguide ridge may be configured to support a single mode.

The splitter may be a multi-mode interference coupler.

The demultiplexer may comprise a plurality of multi-mode output waveguides, each being coupled to the demultiplexing element and configured to receive a respective one of the multi-mode demultiplexed signal components. Each multi-mode output waveguide may be coupled to a respective splitter, each splitter being configured to split the received multi-mode demultiplexed signal component into two single-mode outputs.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Aspects and embodiments of the present invention will now be discussed with reference to the accompanying figures. Further aspects and embodiments will be apparent to those skilled in the art.

Figure 1:
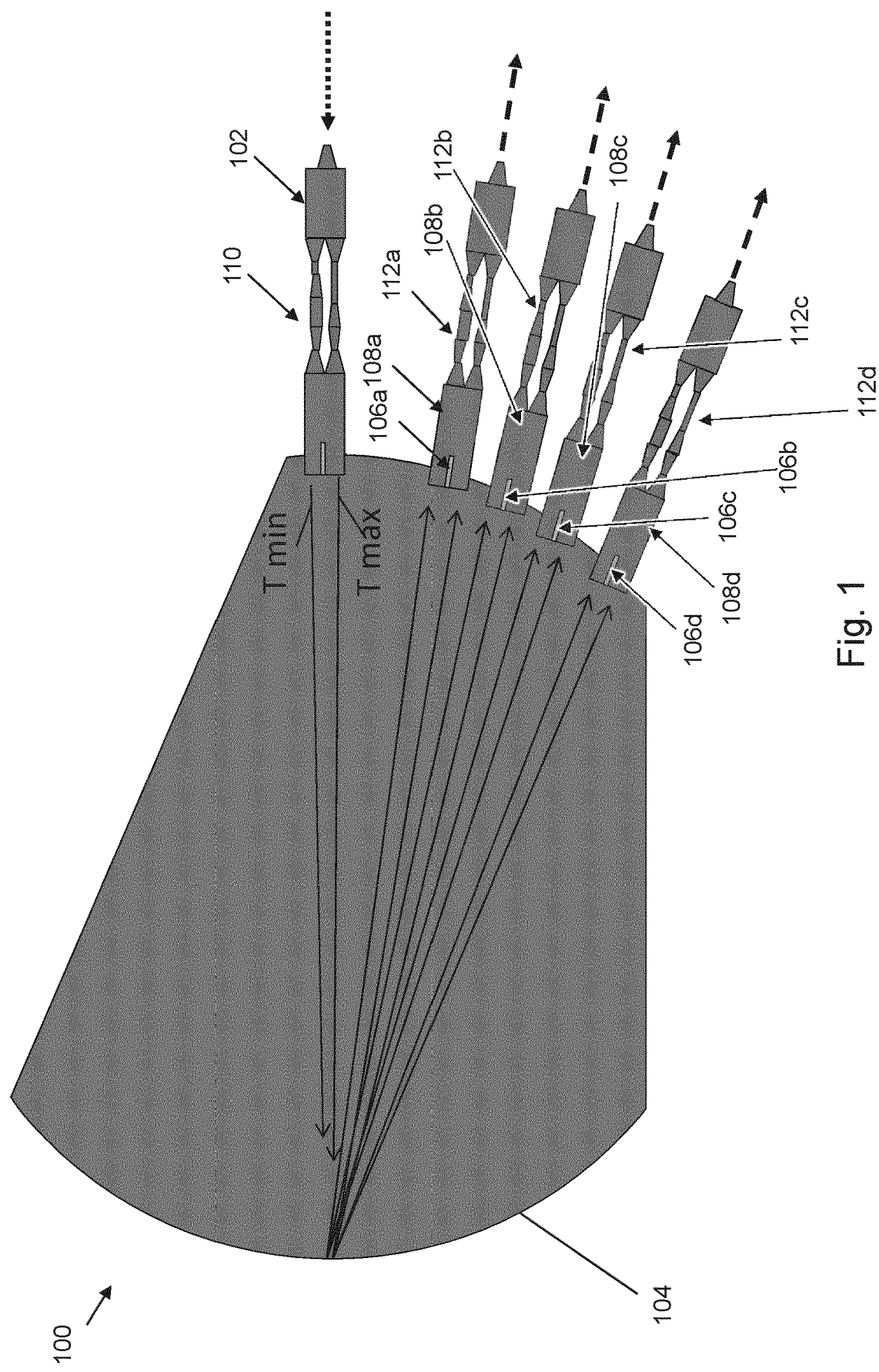
FIG. 1 shows a temperature synchronised demultiplexer.

FIG. 1 shows a temperature synchronised demultiplexer 100. The demultiplexer includes an input waveguide 102, which is configured to receive a wavelength division multiplexed signal (the dotted line). This signal is single-modal, and the input waveguide is a single-mode waveguide. This wavelength division multiplexed signal is provided into a demultiplexing element 104, in this example an Echelle grating or arrayed-waveguide grating (AWG) which demultiplexes the multiplexed signal into a plurality of multi-mode demultiplexed signal components. Each of the multi-mode (or multi-modal) signal components covers a different wavelength. The demultiplexer includes a plurality of output multi-mode waveguides 106a-106d, the output multi-mode waveguides are each connected to a respective splitter 108a-108d. The splitters are configured to split the respective received multi-mode demultiplexed signal into two single-mode outputs. These single mode outputs are then sent downstream for processing (the dashed lines). The Mach-Zehnder interferometers recombine the signal to a single waveguide efficiently. The MZI design is such that the input multimode structure receives light at its two modes from different wavelengths, and the MZI combines those wavelengths at the single output waveguide which then goes to the photodiodes.

In this example the temperature synchronized demultiplexer 100 includes an input Mach-Zehnder interferometer 110. The input Mach-Zehnder interferometer 110 is configured to operate as a wavelength filter, and is temperature synchronized in that the input changes its position to compensate for temperature drift. The temperature synchronized demultiplexer 100 also includes a plurality of output Mach-Zehnder interferometers 112a-112d. Each output Mach-Zehnder interferometer is connected to a respective splitter via a transfer waveguide and is operable as a wavelength filter. The output Mach-Zehnder interferometers also each multiplex two wavelengths which are an equal distance from the channel centre so as to get a "flat-top" response.

Figure 2:
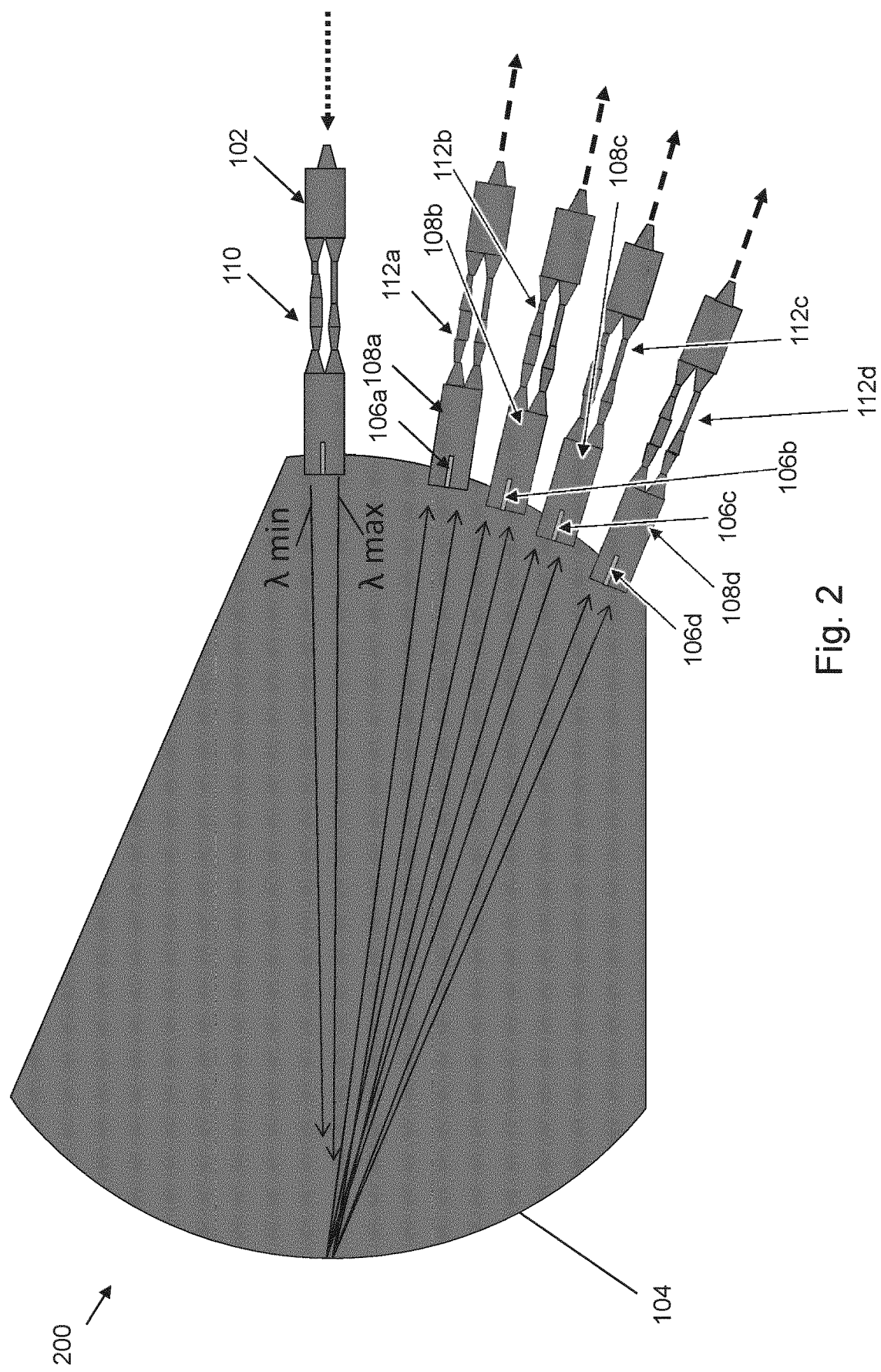
FIG. 2 shows a wavelength synchronised demultiplexer.

FIG. 2 shows a wavelength synchronised demultiplexer 200. Structurally the wavelength synchronized demultiplexer 200 is the same, or substantially the same, as the temperature synchronized demultiplexer 100, and so like features are indicated by like reference numerals. However in this demultiplexer, the input Mach-Zehnder interferometer 110 is operable to change its input position to composite for a change of wavelength. Similarly, the output Mach-Zehnder interferometers 112a-112d each multiplex from different positions as the position shifts with temperature.

Figure 3:
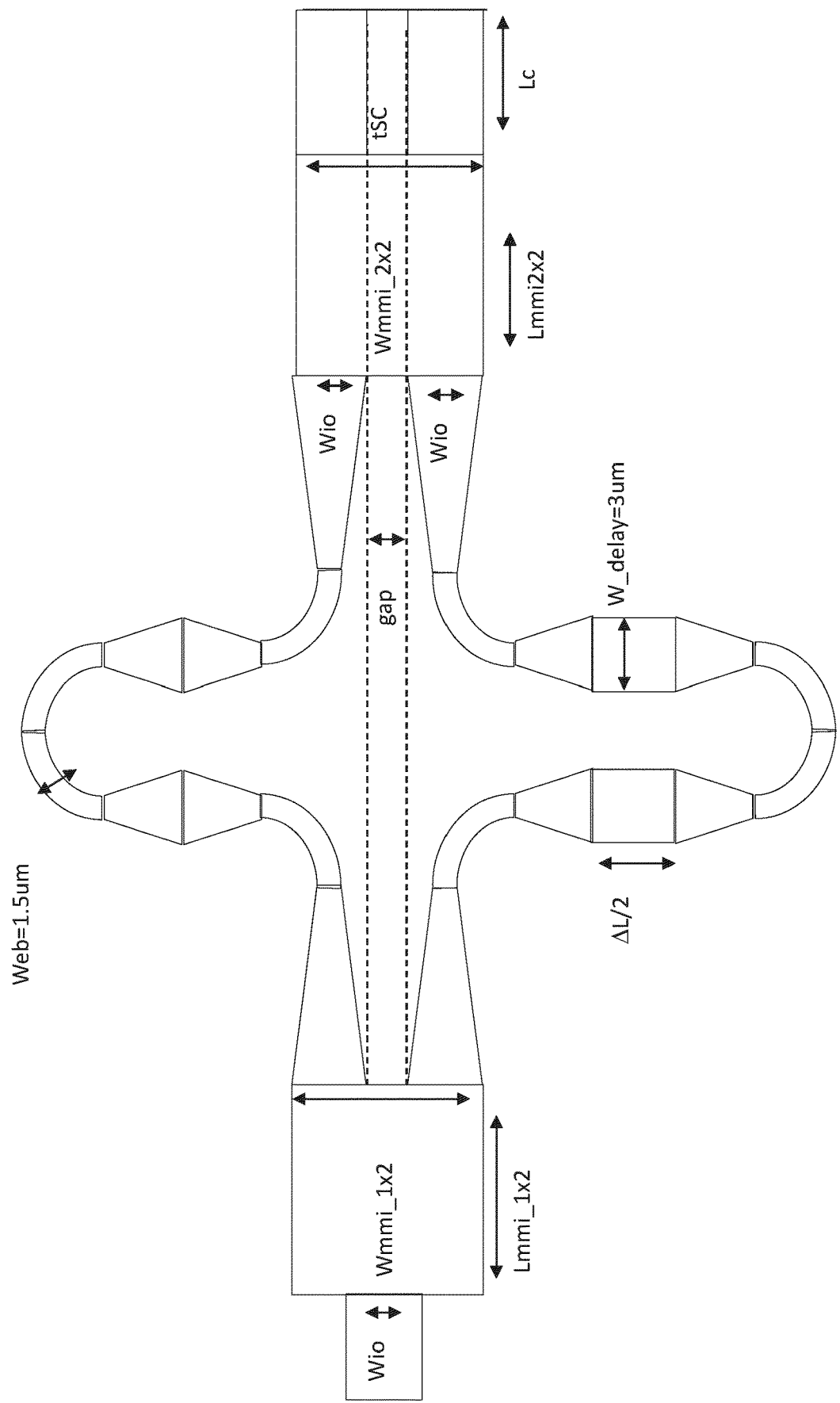
FIG. 3 shows a detailed view of the output structure of the demultiplexers of FIGS. 1 and 2.

FIG. 3 shows a detailed view of the input structure of the demultiplexers 100 and 200. The input structure comprises an input waveguide Wio, which is connected to a splitter Wmmi_1×2 (in this example a multi-mode interference splitter). The splitter has two outputs, which connect to respective arms of a Mach-Zehnder interferometer. In this example, the width of the upper arm is around 1.5 μm (Web), whereas the width of at least a portion of the lower arm is around 3 µm (W_delay) and a path length difference of ∆L/2 is introduced in the lower arm relative to the upper arm. Each arm couples to a coupler, Wmmi_2×2, via waveguides Wio and the coupler recombines the signals. An additional region, tSC, is provided coupled to the combiner, and allows for control over the coupling between the output waveguides of the 2×2MMI which results in turn in better insertion losses and less passband ripples. tSC may have a length of at least 1 µm and no more than 20 µm. The resulting mode is launched into the input free propagation region of the demultiplexing element. The value of dimension $L_c$ shown in FIG. 3 may be at least 10 µm and no more than 1000 µm. The gap may be at least 0.2 µm and no more than 10 µm.

Figure 4:
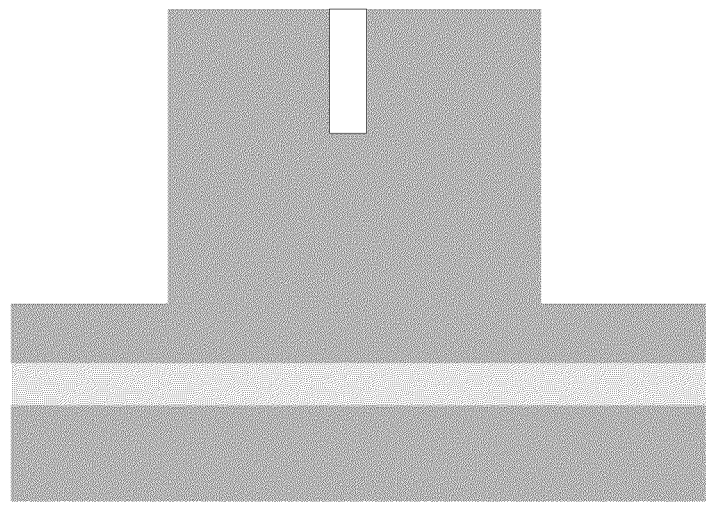
FIG. 4 shows a region of the output structure of FIG. 3.
Figure 5:
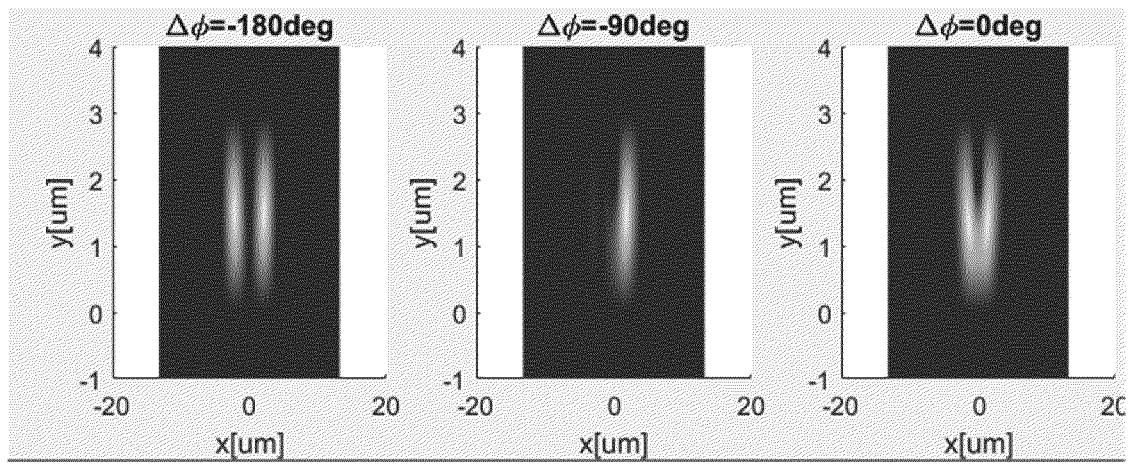
FIGS. 5 and 6 show various optical modes launched into the free propagation region of the demultiplexer from the tSC region a function of phases shifts.
Figure 6:
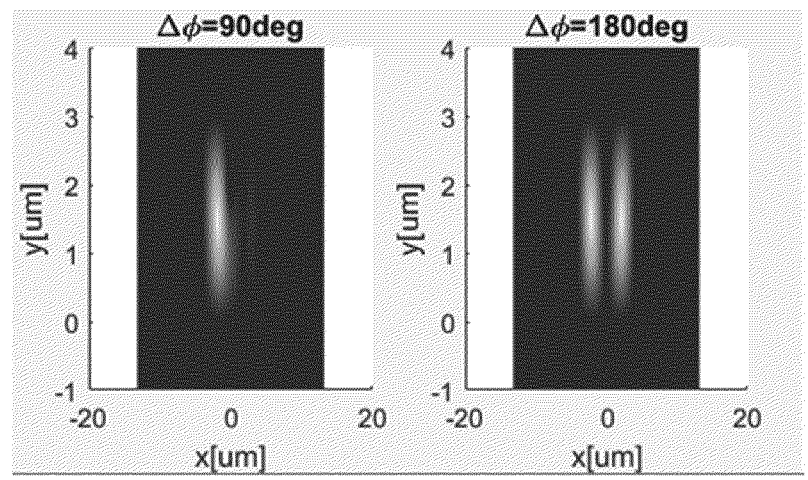
Figure 7:
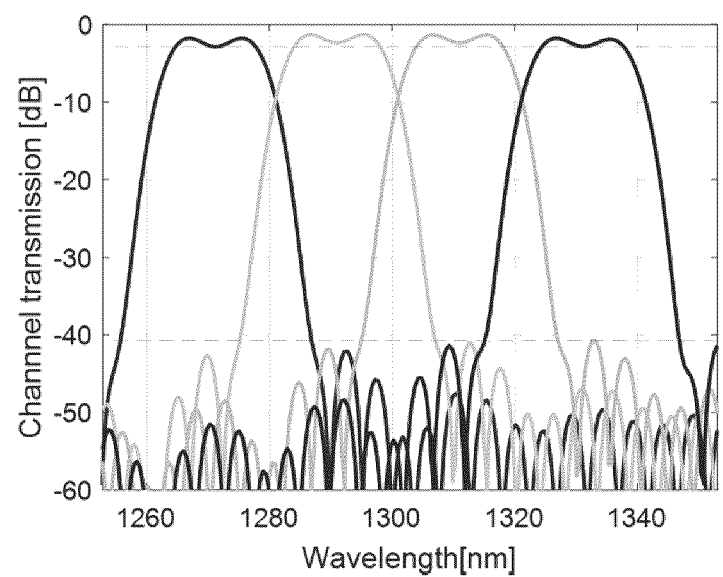
FIG. 7 is a plot of channel transmission against wavelength showing the passband of the output structure of FIG. 3.

FIG. 4 shows the region tSC of the output structure of FIG. 3. This region includes two upstanding waveguide ridges with a shared slab. FIGS. 5 and 6 show various optical modes launched into the free propagation region from the tSC region a function of phase shifts. FIG. 7 is a plot of channel transmission against wavelength showing the passband of the Mach-Zehnder interferometer of FIG. 3. As can be seen, a relatively lower passband ripple and insertion loss can be achieved across a range of wavelengths.

The same structure shown in FIG. 3 can be used for each output from the demultiplexers 100 and 200, where the light would pass from the right-hand side to the left-hand side. That is, the light would enter the region tSC before being split into the Mach-Zehnder interferometer and subsequently recombined in Wmmi_1×2.

Figure 8:
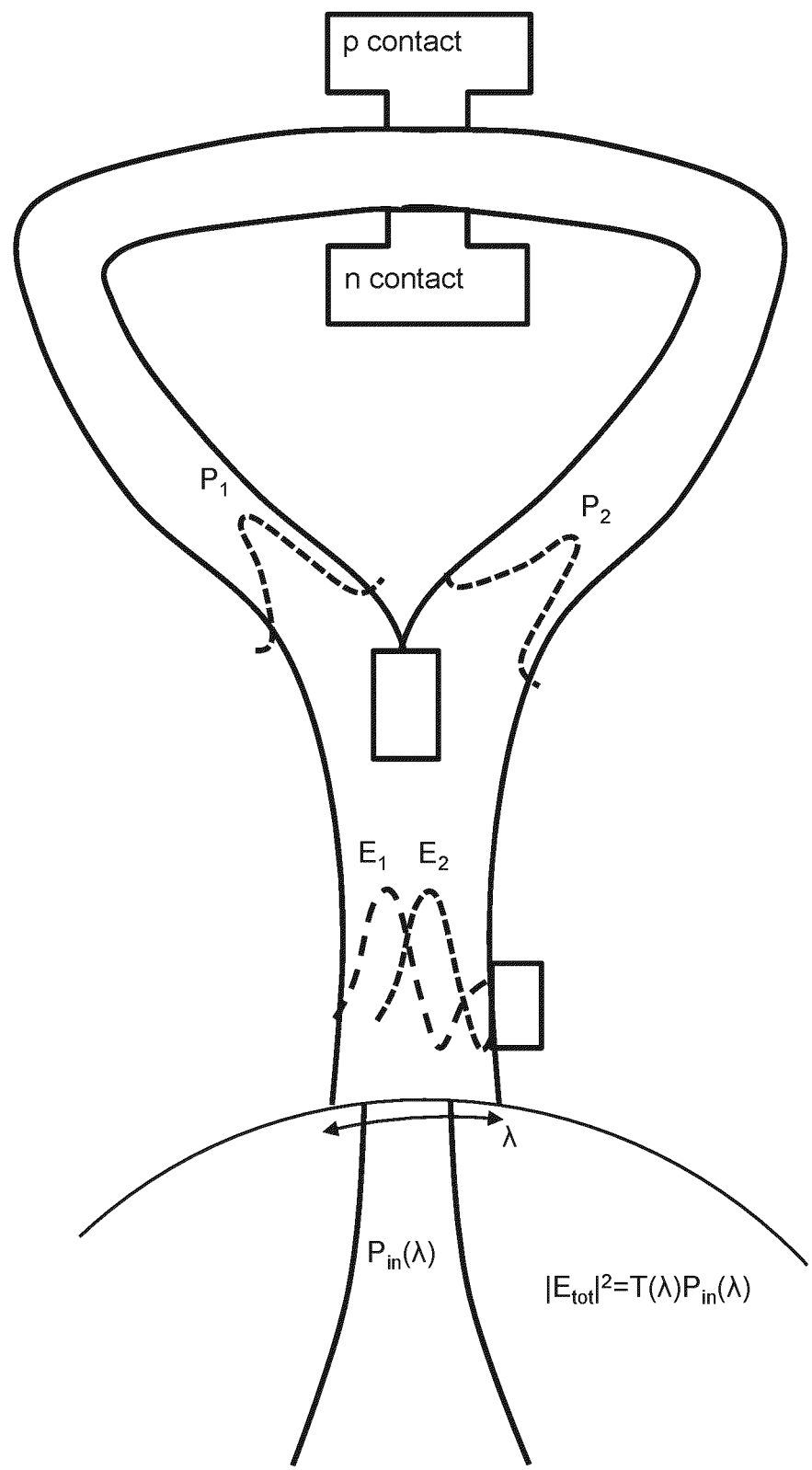
FIG. 8 shows an output of a demultiplexer connected to a photodiode.

FIG. 8 shows an output of a demultiplexer, not including the output structure shown in FIG. 3, connected to a photodiode. The multimode output of the demultiplexer (either an AWG or echelle grating) is connected to a splitter which divides the power ($P_{in}(\lambda)$) into two single mode waveguides: $P_1$ and $P_2$, where $P_1+P_2=|E_{tot}|^2$, $E_1$ and $E_2$ are the respective single modes, $E_{tot}=\alpha_1(\lambda)E_1+\alpha_2(\lambda)E_2$, $|E_{tot}|^2=T(\lambda)P_{in}(\lambda)$, and $T(\lambda)$ is the demultiplexers channel response. The splitter is provided by a waveguide which, in a first section, is wide and supports at least two modes and connects directly to two narrower single mode waveguides. The splitter can achieve a very low excess loss, which means that no matter how the power in the multimode waveguide is distributed between the two single modes, all of the power will always be coupled with some varying ratio between the two single mode waveguides. As the distribution of power between the two modes of the multimode waveguide is determined by the demultiplexer structure, it will depend on wavelength. Therefore, no matter the wavelength, the total guide power of the multimode waveguide will be equal to the sum of the two guided powers in the two single mode waveguides, though the relative ratio in each single mode waveguide will change with wavelength.

After the splitter, the two single mode waveguides are coupled to the two counter propagating inputs of the photodiode, with equal group delay between the two paths, such that the signal (bits) arrive synchronously at the photodiode. The photodiode current will be the sum of the powers in the counter propagating inputs, and therefore will maintain the increased bandwidth of the demultiplexer.

Figure 9:
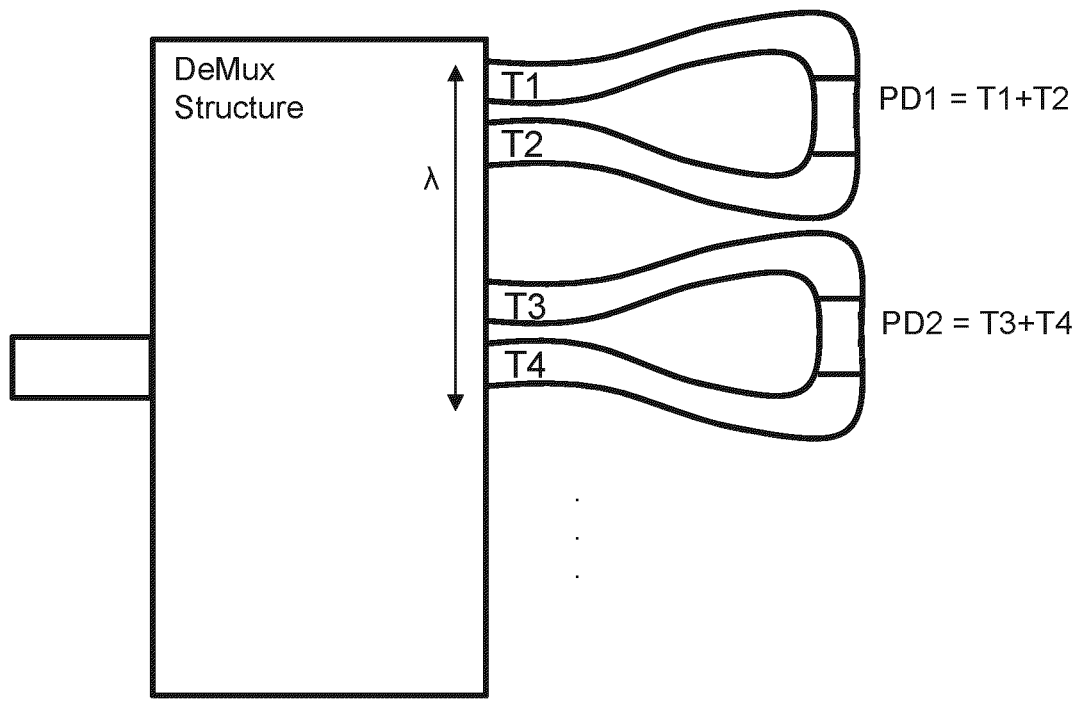
FIG. 9 shows a demultiplexer connected to a plurality of photodiodes.
Figure 10:
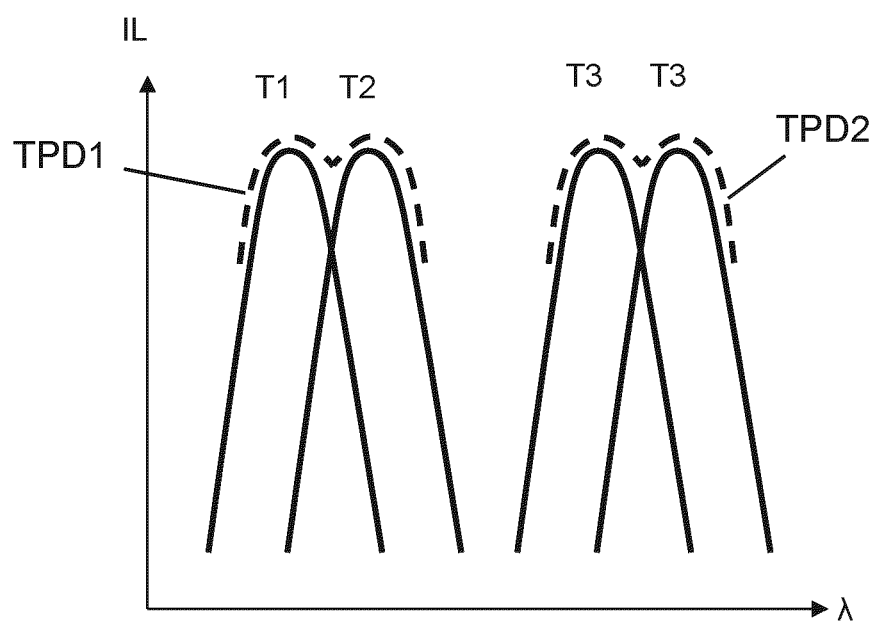
FIG. 10 shows a plot of insertion loss against wavelength of the photodiodes shown in FIG. 9.

FIG. 9 shows a demultiplexer connected to a plurality of photodiodes, implementing a 4 channel demultiplexer. The demultiplexer has 8 channels in pairs of two channels, each as a single mode waveguide. Each pair of channels has a centre separated by the desired channel spacing with the centre of the next pair of channels, but the channel pairs have optimized centre spacing and bandwidths to meet the desired system specification. Each of the single mode waveguides of a pair of channels is coupled to opposite ends of a photodiode, as described with reference to FIG. 8. Therefore pairs of single mode channels have a the following power transmission characteristics: $\{T_1(\lambda), T_2(\lambda)\}, \{T_3(\lambda), T_4(\lambda)\}$. The corresponding photodiodes have a photocurrent which depends on the wavelength $\lambda$ as $T_{PD1}(\lambda)=T_1(\lambda)+T_2(\lambda)$, $T_{PD2}(\lambda)=T_3(\lambda)+T_4(\lambda)$. By careful consideration of $T_i(\lambda)+T_{i+1}(\lambda)$ a flatter transmission spectrum with good crosstalk can be realised, as the crosstalk will only depend on the width of the narrower channels $T_i(\lambda)$. FIG. 10, showing a plot of insertion loss against wavelength of the photodiodes shown in FIG. 9, illustrates this point.

Figure 11:
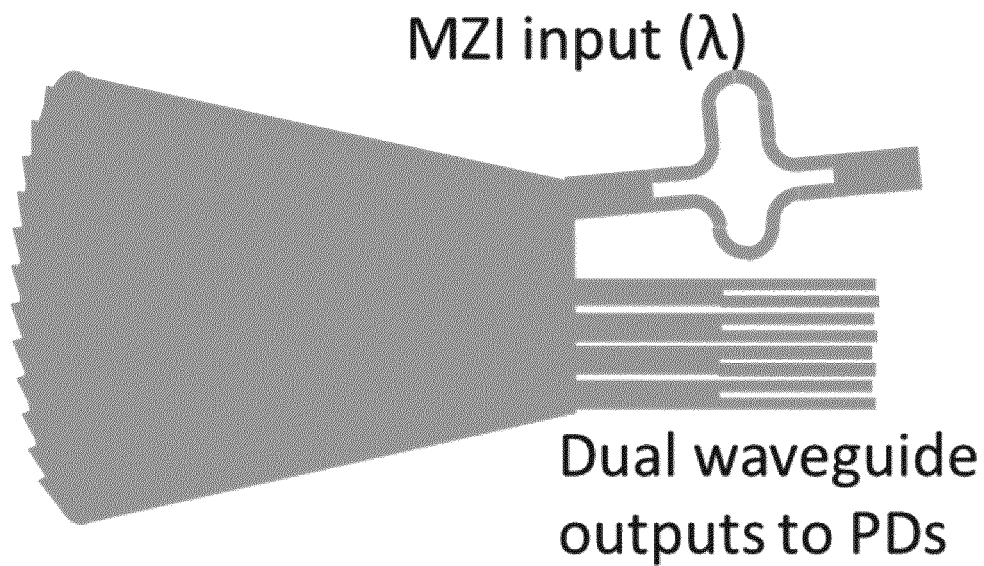
FIG. 11 shows a variant demultiplexer.
Figure 12:
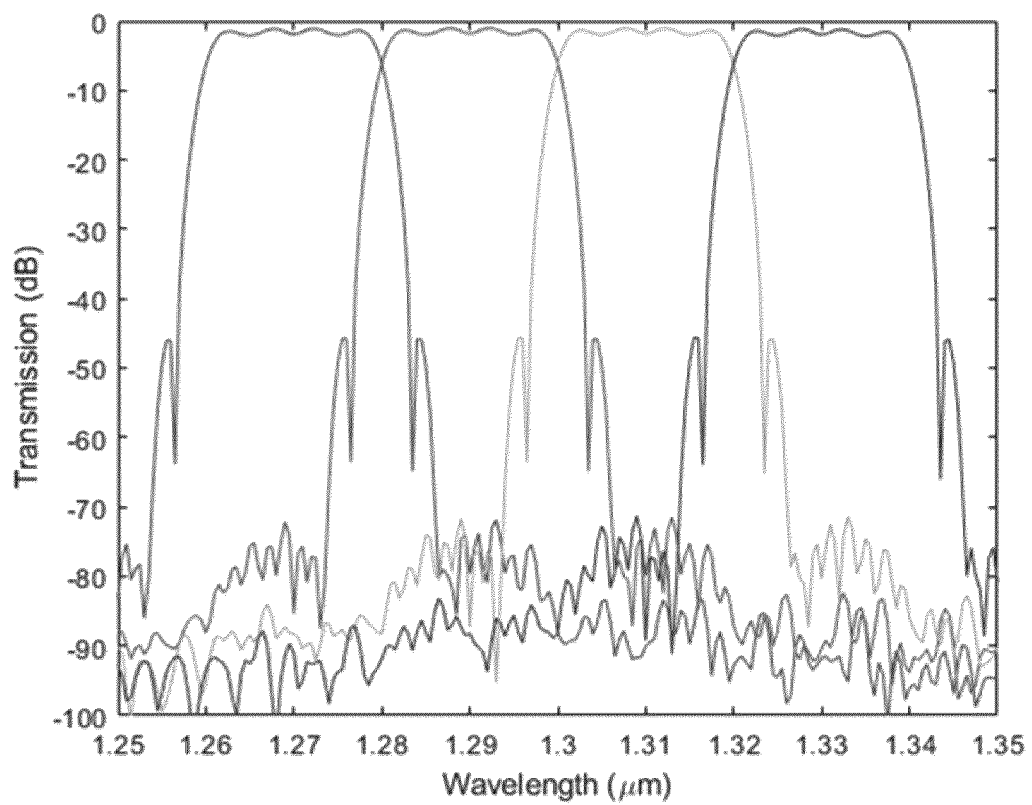
FIG. 12 is a plot of transmission against wavelength for the variant demultiplexer of FIG. 11.
Figure 13:
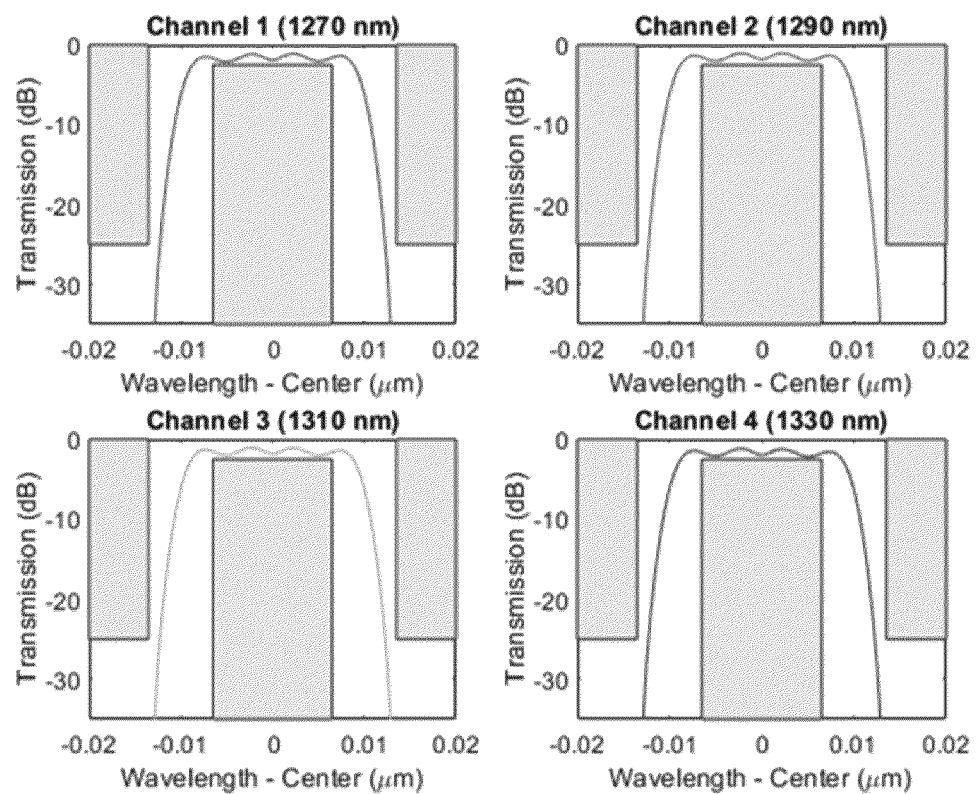
FIG. 13 shows plots of transmission against wavelength for four different wavelengths for the variant demultiplexer of FIG. 11.

FIG. 11 shows a variant demultiplexer, which is wavelength-synchronized. The demultiplexer of FIG. 11 differs from that shown in FIGS. 1 and 2 in that the output waveguides of the demultiplexer do not have the same output structure shown in FIG. 3. Rather the demultiplexing element of FIG. 11 connects directly to a splitter, which provides dual waveguide outputs to photodiodes connected downstream. FIG. 12 is a plot of transmission against wavelength for the variant demultiplexer of FIG. 11. FIG. 13 shows passband plots for four different wavelengths for the variant demultiplexer of FIG. 11. The echelle has a baseline insertion loss of between 0.8 and 0.9 dB, with a grating period of 9 µm. The plots illustrate superior pass through properties across a range of wavelengths.

Figure 14:
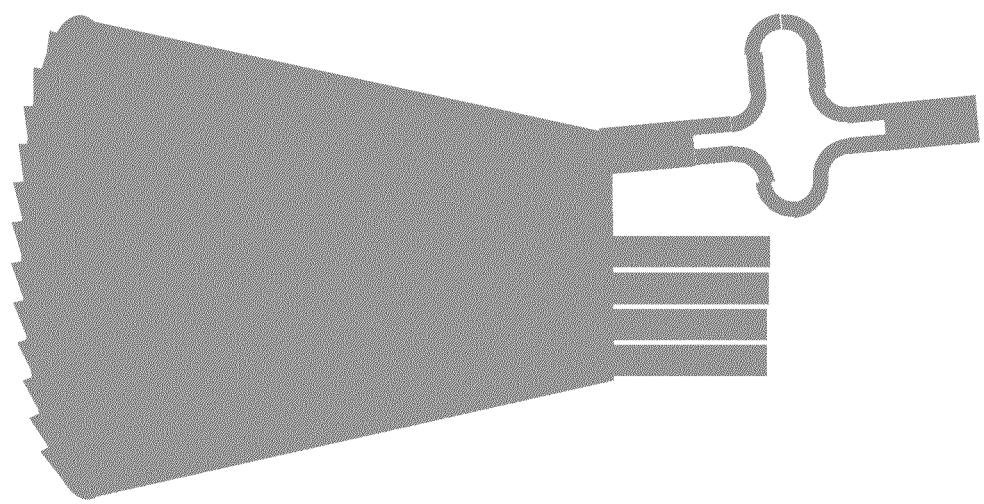
FIG. 14 shows a variant demultiplexer.
Figure 15:
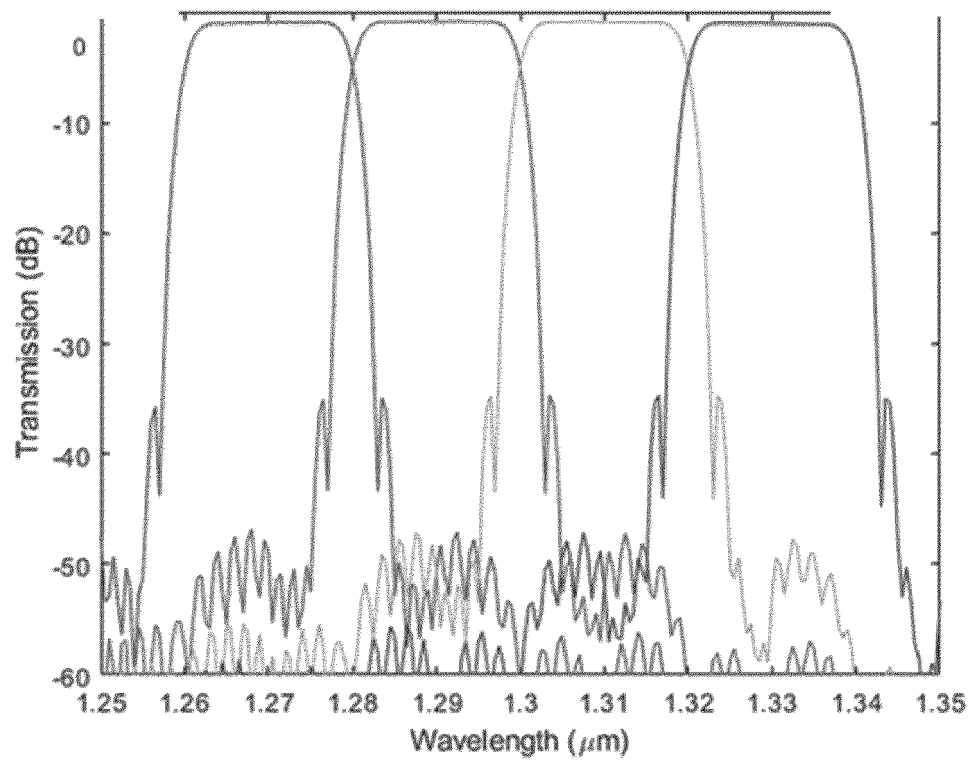
FIG. 15 is a plot of transmission against wavelength for the variant demultiplexer of FIG. 14.
Figure 16:
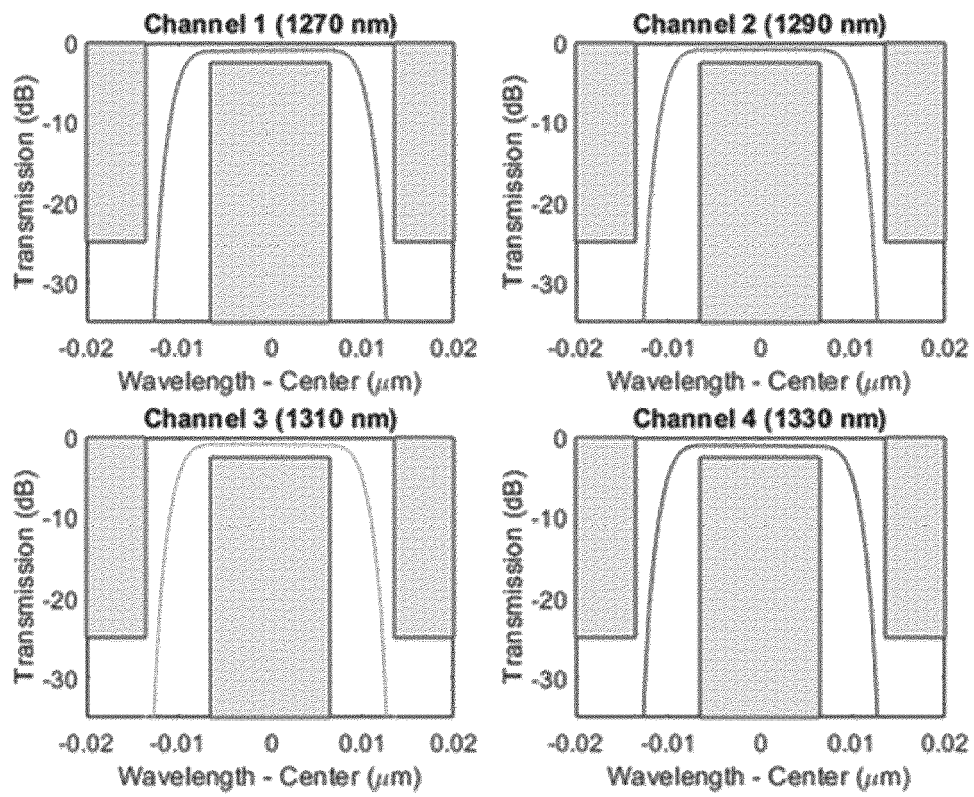
FIG. 16 shows plots of transmission against wavelength for four different wavelengths for the variant demultiplexer of FIG. 14.

FIG. 14 shows a variant demultiplexer, which is wavelength-synchronized. The demultiplexer of FIG. 14 differs from that shown previously in that the output waveguides of the demultiplexer are multimodal waveguides. FIG. 15 is a plot of transmission against wavelength for the variant demultiplexer of FIG. 14. FIG. 16 shows passband plots for four different wavelengths for the variant demultiplexer of FIG. 14. The demultiplexer element is an echelle grating, with a baseline insertion loss of between 0.8 and 0.9 dB, and a grating period of 9 µm. The plots only consider the first 8 modes. The wavelength-synchronized Mach-Zehnder interferometer input broadens the flat-top response to 18 nm, and the outputs would be connected to multimode photodiodes.

The features disclosed in the description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example+/−10%.

The invention claimed is:

1. A demultiplexer, for use in a wavelength division multiplexed system, the demultiplexer comprising:
   an input waveguide, configured to receive a wavelength division multiplexed signal;
   a wavelength demultiplexing element, configured to demultiplex the multiplexed signal received from the input waveguide into a plurality of multi-spatial-mode demultiplexed signal components respectively having a plurality of different wavelengths;
   a multi-spatial-mode output waveguide, the multi-spatial-mode output waveguide being coupled to the demultiplexing element and configured to receive one of the multi-spatial-mode demultiplexed signal components; and
   a splitter, coupled to the multi-spatial-mode output waveguide, and configured to split the received multi-spatial-mode demultiplexed signal component into two single-spatial-mode outputs and to provide each of the two single-spatial-mode outputs to a respective transfer waveguide, and
   wherein the demultiplexer includes an output Mach-Zehnder interferometer connected to each of the respective transfer waveguides and operable as a wavelength filter, each output Mach-Zehnder interferometer of the output Mach-Zehnder interferometers has two arms of different path lengths and is configured to multiplex two wavelengths that are equal distance from a channel center of the output Mach-Zehnder interferometer so that the frequency response of the output Mach-Zehnder interferometer is a flat-top response, and
   wherein the demultiplexer includes an input Mach-Zehnder interferometer connected between the input waveguide and the demultiplexing element, the input Mach-Zehnder interferometer having two arms of different path lengths, and the input Mach-Zehnder interferometer being operable as a wavelength filter.

2. The demultiplexer of claim 1, wherein the splitter is configured to split the received multi-spatial-mode demultiplexed signal asymmetrically.

3. The demultiplexer of claim 1, wherein the splitter is configured to split the received multi-spatial-mode demultiplexed signal symmetrically.

4. A demultiplexer, for use in a wavelength division multiplexed system, the demultiplexer comprising:
   an input waveguide, configured to receive a wavelength division multiplexed signal;
   a wavelength demultiplexing element, configured to demultiplex the multiplexed signal received from the input waveguide into a plurality of multi-spatial-mode demultiplexed signal components respectively having a plurality of different wavelengths;
   a multi-spatial-mode output waveguide, the multi-spatial-mode output waveguide being coupled to the demultiplexing element and configured to receive one of the multi-spatial-mode demultiplexed signal components; and
   a splitter, coupled to the multi-spatial-mode output waveguide, and configured to split the received multi-spatial-mode demultiplexed signal component into two single-spatial-mode outputs and to provide each of the two single-spatial-mode outputs to a respective transfer waveguide,
   wherein the demultiplexer is a receiver and includes a waveguide photodiode, connected at a first end to one of the transfer waveguides and connected at a second end to the other of the transfer waveguides,
   wherein the two transfer waveguides are configured to provide the two single-spatial-mode outputs to the waveguide photodiode in counter propagating directions through the waveguide photodiode,
   wherein the two transfer waveguides are configured to have an equal group delay such that the two single-spatial-mode outputs arrive synchronously at the waveguide photodiode,
   wherein the waveguide photodiode is configured to absorb at least 90% of the signal received from either end within a half of a length of the waveguide photodiode, and
   wherein the transfer waveguides have a similar or substantially identical optical path length, and
   wherein the demultiplexer includes an input Mach-Zehnder interferometer connected between the input waveguide and the demultiplexing element, the input Mach-Zehnder interferometer having two arms of different path lengths, and the input Mach-Zehnder interferometer being operable as a wavelength filter.

5. The demultiplexer of claim 1, wherein the transfer waveguides have a similar or substantially identical optical path length.

6. The demultiplexer of claim 1, wherein the demultiplexing element is an arrayed waveguide grating, or an echelle grating.

7. The demultiplexer of claim 1, wherein the multi-spatial-mode output waveguide comprises a pair of waveguide ridges projecting from a shared waveguide slab.

8. The demultiplexer of claim 7, wherein each waveguide ridge is configured to support a single spatial mode.

9. The demultiplexer of claim 1, wherein the splitter is a multi-spatial-mode interference coupler.

10. The demultiplexer of claim 1, comprising a plurality of multi-spatial-mode output waveguides comprising the multi-spatial-mode output waveguide, each of the plurality of multi-spatial-mode output waveguides being coupled to the demultiplexing element and configured to receive a respective one of the multi-spatial-mode demultiplexed signal components.

11. The demultiplexer of claim 10, wherein each of the plurality of multi-spatial-mode output waveguides is coupled to a respective splitter configured to split the received multi-spatial-mode demultiplexed signal component into two single-spatial-mode outputs.

* * * * *